Figure 1:
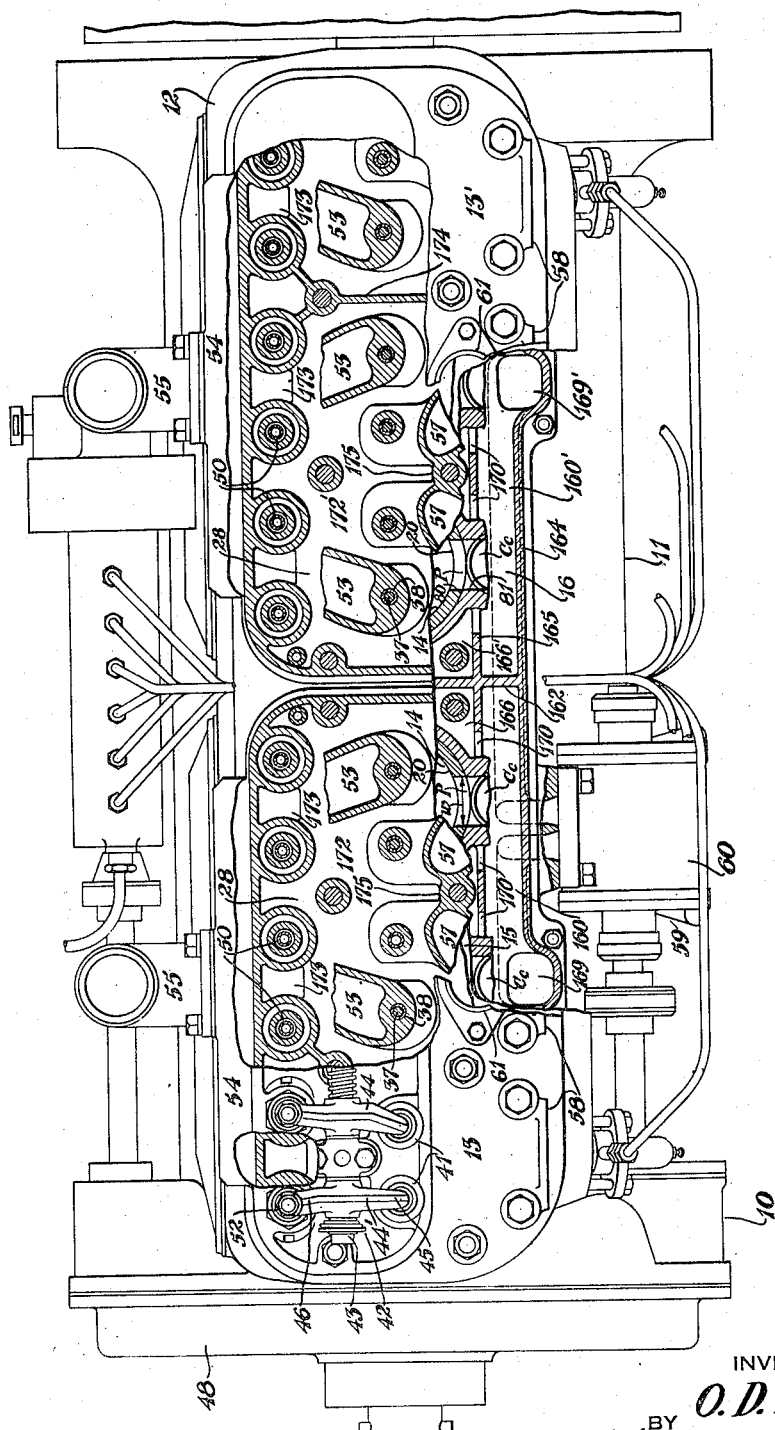

April 14, 1936.　　　　O. D. TREIBER　　　　2,037,354
INTERNAL COMBUSTION ENGINE AND COOLING APPARATUS THEREFOR
Filed July 6, 1933　　　　4 Sheets-Sheet 1

INVENTOR
O. D. Treiber
BY
ATTORNEYS

April 14, 1936. O. D. TREIBER 2,037,354
INTERNAL COMBUSTION ENGINE AND COOLING APPARATUS THEREFOR
Filed July 6, 1933 4 Sheets-Sheet 4

INVENTOR
O. D. Treiber
BY
ATTORNEYS

Patented Apr. 14, 1936

2,037,354

UNITED STATES PATENT OFFICE 2,037,354

INTERNAL COMBUSTION ENGINE AND COOLING APPARATUS THEREFOR

Otis D. Treiber, Canton, Ohio, assignor to Hercules Motors Corporation, Canton, Ohio, a corporation of Ohio Application July 6, 1933, Serial No. 679,175

10 Claims. (Cl. 123—173)

The invention relates in general to internal combustion engines preferably of the compression ignition type, and in which preferably liquid hydrocarbon fuel is injected into the combustion chambers of the engine; and more particularly the invention relates to such an engine as set forth in my United States Letters Patent No. 1,960,093, issued May 22, 1934, for Compression ignition internal combustion engines, on my prior application filed February 3, 1933, Serial No. 655,079.

In my said U. S. Letters Patent No. 1,960,093, there is set forth an engine including among others the present improvements in part, and in which the preferably liquid hydrocarbon fuel is injected into the combustion chambers of the engine, and which is capable of operation at relatively high speeds of rotation of the crank shaft of the engine, which may be for example 2000 to 3000 R. P. M., and with a relatively high mean indicated pressure in the combustion chambers of the engine, which may be for example a mean indicated pressure of as high as 160 pounds per square inch at 2000 R. P. M.

In the compression ignition internal combustion engine of my said U. S. Letters Patent No. 1,960,093 and of the present application, the mixing and combustion chambers are so formed and arranged as to cause proper mixing and combustion of the injected fuel at high speeds of rotation of the crank shaft of the engine.

The valve apparatus for such an engine must be mechanically suitable for the relatively high speed operation and must be adequately lubricated, and the valve apparatus of the engine of my said U. S. Letters Patent No. 1,960,093, and of the present application, include the preferred and novel valve apparatus set forth in detail and claimed in my application for U. S. Letters Patent for Internal combustion engines and valve apparatus therefor, filed July 1, 1933, Serial No. 678,689.

The engine set forth in my said U. S. Letters Patent No. 1,960,093, in my said application, Serial No. 678,689, and also as set forth herein in conjunction with the present improvements, constitutes a "valve-in-head" engine including among other parts, a cylinder block, a cylinder head, and a crank case, in which constant volume mixing and combustion chambers are provided in the cylinder block and located as closely as possible to, and communicatingly connect with, varying volume chambers formed by the cylinder bores, the cylinder heads, and the pistons, and in which the valve seat orifices and ports or passageways are formed in the cylinder head, and the valves are operatively mounted on the cylinder head in cooperative relationship with the valve seat orifices.

In general, the cooling apparatus for such an engine must be so constructed and adapted for operation as to adequately cool the constant volume and varying volume chambers, to prevent overheating thereof and subsequent distortion and/or destruction thereof, and/or of the parts operatively mounted therein or associated therewith.

The cooling apparatus of such an engine must also be so constructed and adapted for operation as to adequately cool the valve seat orifices and ports or passageways, to prevent overheating thereof and subsequent distortion and/or destruction thereof, and/or of the valves and other parts operatively mounted therein or associated therewith.

For properly cooling such an engine as aforesaid, it is desirable and necessary that the cooling medium, such as water, should be delivered at as high a velocity and at as low a temperature as is practically possible to the hottest parts of the engine, which are the walls of the constant volume chambers into which the fuel is injected; and such walls and the other walls of the engine necessary to be cooled are located in communicatingly connecting compartments formed in the cylinder block and cylinder head through which the cooling medium flows, and the cooling medium should be regulated and directed in its flow through the cooling compartments of the engine so that the cooling of the walls to be cooled therein is effected by a high velocity flow of cooling medium.

In most engines it is desirable that the dead weight of the engine be maintained at a minimum, and that the strength of the parts thereof, particularly the cylinder block, should be maintained at a maximum, and in many engines the communicatingly connecting cooling compartments are formed by walls which add to the weight of the engine but do not increase the strength thereof.

The objects of the present improvements include in general the provision of a preferably compression ignition internal combustion engine including novel and adequate cooling means enabling operation of the engine at relatively high speeds and relatively high compression and power output, without overheating.

More particularly, the objects of the present improvements include the provision of a preferably "valve-in-head" engine including among other parts, a cylinder block, a cylinder head, and a crank case, and in which constant volume mixing and combustion chambers are provided in the cylinder block and are located as closely as possible to and communicatingly connect with varying volume chambers formed by the cylinder bores, the cylinder heads, and the pistons, and in which valve seat orifices and ports or passageways are formed in the cylinder head and valves are operatively mounted in the cylinder head in cooperative relationship with the valve seat orifices, and in which novel cooling apparatus is provided and associated with the other parts of the engine, whereby water jackets or cooling compartments are formed about the constant volume chambers in the cylinder block and about the valve seat orifices and ports in the cylinder head, the cooling compartments communicatingly connecting with each other and being adapted for communicating connection with a radiator and a pump whereby cooling medium, usually water, is delivered at a relatively high velocity and at a low temperature directly about the walls of the constant volume chambers and flows therefrom about the cylinders and thence about the valve port walls and valve seat orifices.

Further objects of the present improvements include the provision of a cylinder block having cooling compartments formed therein by one or more partition walls formed in the interior thereof, and in which the partition walls are so located and arranged as to cooperate structurally in the engine so as to attain the necessary structural strength for the engine and a minimum dead weight therefor.

Further objects of the present improvements include the provision of improved details of construction and arrangement for certain of the parts of the engine and the cooling apparatus therefor, as hereinafter set forth.

The foregoing and other objects are attained by the improvements, apparatus, parts, combinations, and sub-combinations, which comprise the present invention, and the nature of which is set forth in the following general statement, and preferred embodiments of which together with their mode of use are set forth in the following description, and which are particularly and distinctly pointed out and set forth in the appended claims forming part hereof.

The nature of the improvements of the present invention may be described in general terms as including in an internal combustion engine, preferably of the character set forth in my said U. S. Letters Patent No. 1,960,093 and my said prior application, Serial No. 678,689, in combination with other usual or improved parts, a cylinder block, a cylinder head, and a crank case, and in which constant volume mixing and combustion chambers are provided in the cylinder block and are located as closely as possible to and communicatingly connect with the varying volume chambers formed by the cylinder bores, the cylinder heads and the pistons, and in which the valve seat orifices and ports or passageways are formed in the cylinder head, and the valves are operatively mounted in the cylinder head in cooperative relationship with the valve seat orifices.

The cylinder block includes within its interior a longitudinally extending partition wall which extends between the end walls of the cylinder block and the top and bottom walls thereof, and is located between the walls forming the constant volume chambers and the cylinders and thus forms in the interior of the cylinder block two longitudinally extending cooling or water jacket chambers or compartments.

The cylinder block cooling compartment beneath the walls of the constant volume chambers is laterally narrower than the compartment on the other side of the partition in which the cylinders are located.

A water pump is operatively mounted on the engine and its outlet opening communicatingly connects with the smaller cooling chamber of the cylinder block beneath the walls of the constant volume chambers.

The walls forming the constant volume chambers are located closely adjacent the upper wall of the cylinder block, and the partition wall is provided at its upper end with restricted openings providing communication between the two longitudinally extending cooling or water jacket chambers of the cylinder block, there being a restricted opening preferably located at each side of the walls of each constant volume chamber.

Each cylinder head has formed therein cooling or water jacket chambers surrounding the walls of the valve passageways and the valve seat orifices, and registering openings formed in the top wall of the cylinder block and the bottom wall of the cylinder head provide communication for the flow of cooling medium between the preferably larger cooling chamber of the cylinder block in which the cylinders are located and the cooling or water jacket chambers of the cylinder head.

The cylinder head is preferably provided with partition walls at the sides of the openings for the flow of cooling medium thereinto and at the sides of the exhaust and air intake valve passageway walls, whereby the cooling medium is directed between the air intake and exhaust passageway walls.

One or more cooling water outlet pipes are provided for each cylinder head and are connected in a usual manner with a radiator and the radiator is in turn connected in a usual manner with the intake of the water pump.

The engine preferably includes further novel improvements as illustrated in the drawings and/or as hereinafter set forth.

Figure 2:
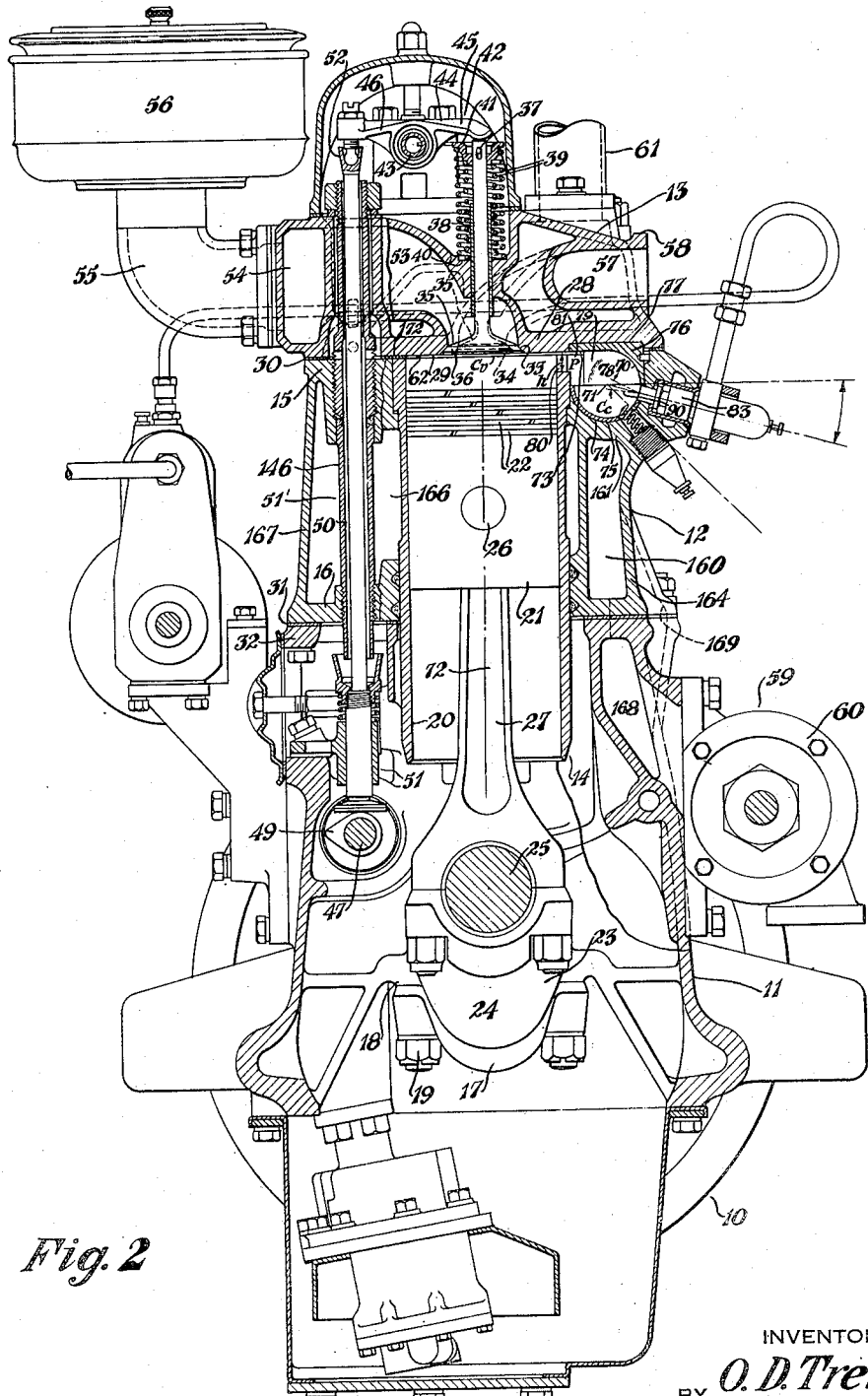
Figure 3:
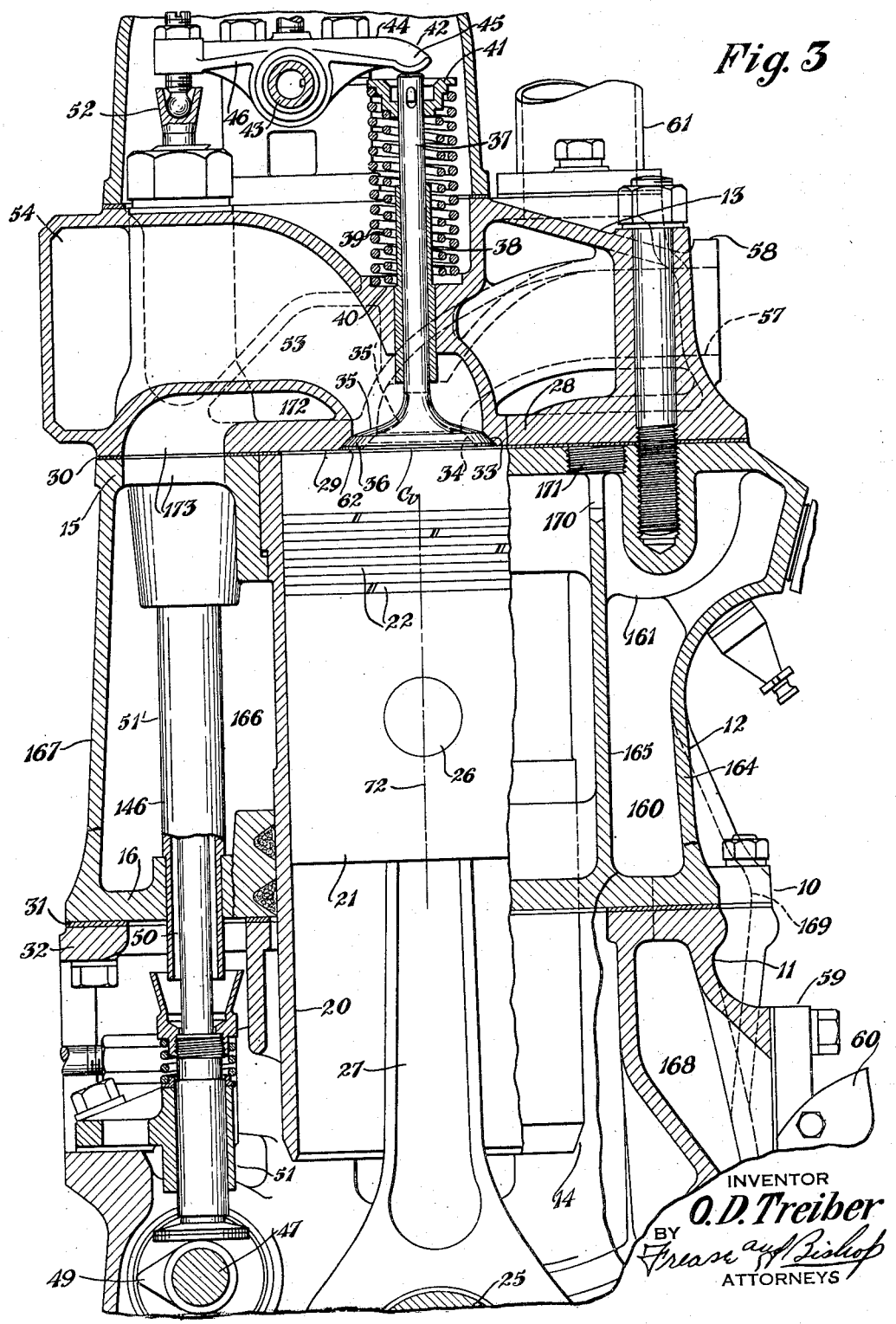
Figure 4:
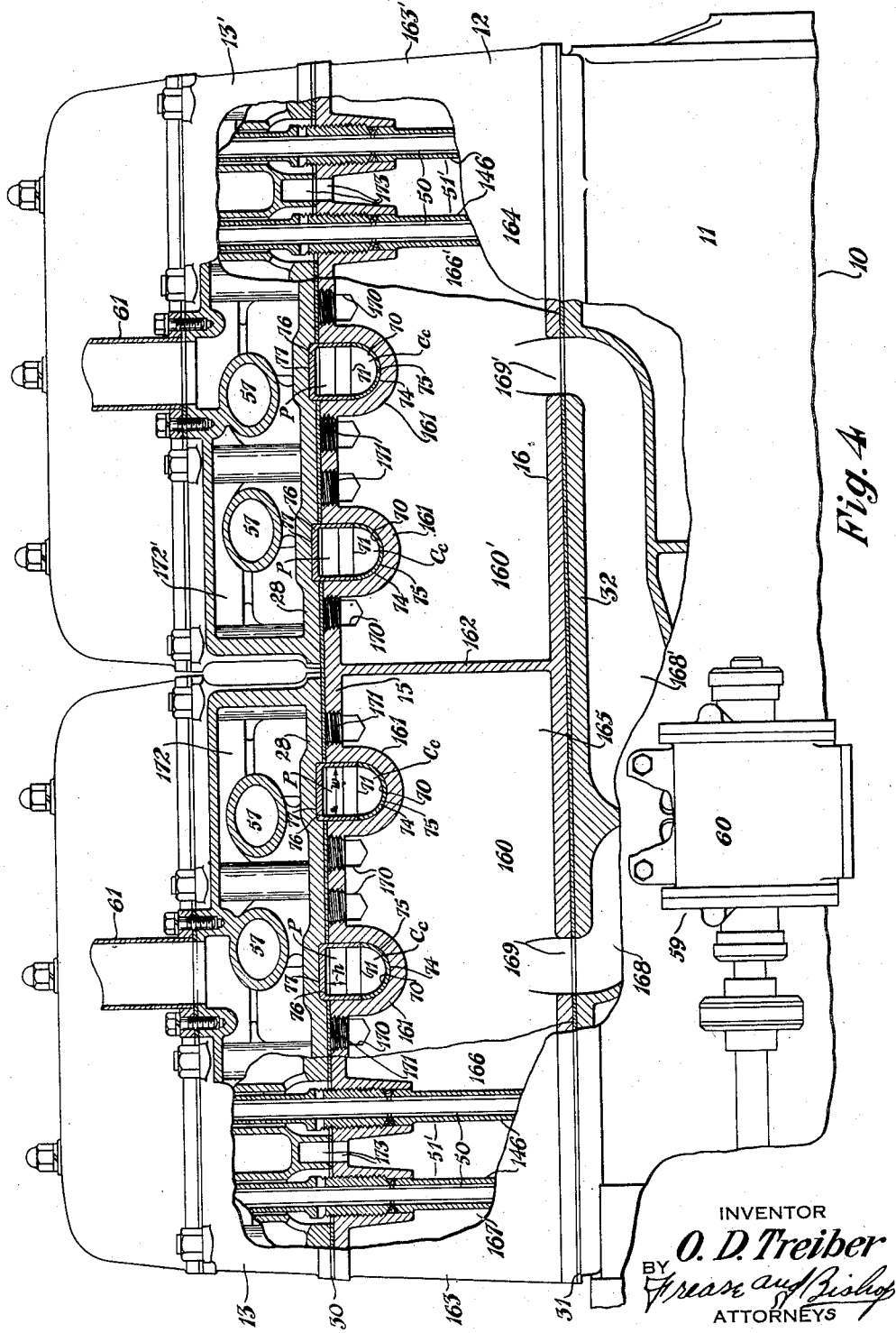

A compression ignition internal combustion engine embodying among others the present improvements is illustrated in the accompanying drawings forming part hereof, in which Figure 1 is a fragmentary top plan view of the engine, with portions broken away to illustrate details of construction and arrangement;

Fig. 2, a slightly enlarged transverse sectional view thereof, with portions broken away, and illustrating one of the cylinders of the engine and its piston and the combustion chambers associated therewith; and also illustrating partly in vertical section and partly in elevation the associated and improved cooling apparatus; and further illustrating an air cleaner in place on one of the air intake elbows of the engine;

Fig. 3, a still further enlarged fragmentary view similar to Fig. 2, but with different portions broken away to more clearly illustrate the improved cooling apparatus; and Fig. 4, a fragmentary side elevation view of the engine, looking in the direction of the arrows 4—4, Fig. 1, with portions broken away and illustrated in longitudinal vertical section, and showing the improved cooling apparatus and associated parts.

Similar numerals refer to similar parts throughout the drawings.

The compression ignition internal combustion engine embodying among others the present improvements is indicated generally at 10, and as illustrated is a six cylinder, four stroke cycle, single action, high speed, compression ignition internal combustion engine, in which the air for combustion is obtained normally directly from the atmosphere, and in which separate quantities or charges of the preferred liquid hydrocarbon fuel, such as Diesel oil, are successively injected into the combustion chambers of the engine at successive timed intervals, one charge being injected into the combustion chambers of each cylinder during each four stroke cycle of the piston operatively mounted in the cylinder.

The compression ignition internal combustion engine 10, includes in combination with other usual parts of a high speed internal combustion engine, a crank case 11, a cylinder block 12, and cylinder heads 13 and 13'.

The cylinder block 12 includes therein walls forming the cylinders, one of which is illustrated in detail in the drawings and is indicated at 14, and the cylinders 14 as illustrated are preferably in the form of externally shouldered sleeves each of which extends through and is seal seated in registering bores formed respectively in the normally upper cylinder block wall 15 and the normally lower cylinder block wall 16.

The cylinder heads 13 and 13', the cylinder block 12, the crank case 11, and the lower half 17 of each main bearing block 18 are preferably separable, as shown.

In the bore 20 of each of the sleeve cylinders 14, a piston 21 provided with piston rings 22 is operatively mounted in a usual manner for high speed engines for reciprocation in the cylinder bore.

A crank shaft 23 is operatively mounted in a usual manner for high speed engines in the crank case in the main bearing blocks 18, and the crank shaft 23 includes, opposite each piston 21, crank arms 24 between the outer ends of which extends a crank pin 25, and each piston 21 has operatively mounted therein in a usual manner for high speed engines a wrist pin 26, and a connecting rod 27 operatively connects each crank pin 25 with each wrist pin 26.

It is to be particularly noted that the crank shaft 23, the connecting rods 27, the wrist pins 26, and the pistons 21 are not only operatively associated with each other as aforesaid in a usual manner for high speed engines, but are each of the size, proportion, and minimum weight, characteristic of such parts for high speed engines.

Each cylinder head 13 and 13', includes a normally lower wall 28, each of which is provided for each cylinder covered thereby with a preferably flat normally lower surface 29 extending transversely across the upper end of the bore of the particular cylinder.

A usual gasket 30 is interposed in the usual manner between the normally lower wall 28 of each of the cylinder heads 13 and 13', and the normally upper wall 15 of the cylinder block 12, and similarly a usual gasket 31 is interposed in the usual manner between the normally lower wall 16 of the cylinder block 12, and the normally upper wall 32 of the crank case 11.

As illustrated the engine 10 is a valve-in-head engine, and accordingly each normally lower wall 28 of the cylinder heads 13 and 13' has formed therein above the normally upper end of the bore of each cylinder covered thereby, an air intake valve seat orifice 33 and an exhaust valve seat orifice 34, and each of the valve seat orifices has a valve seat formed therein.

A valve 35 is operatively associated with each valve seat orifice 33, and a valve 35' is operatively associated with each valve seat orifice 34, and each of the valves includes a valve head 36 fitting in its respective seat, and a valve stem 37 extending upwardly from the head.

The cylinder heads 13 and 13' have mounted therein valve stem guide tubes 38, one for each valve stem 37, and each valve head 36 is normally maintained in its seat by usual means such as a set of compression springs 39, one end of which reacts against a spring seat 40 formed about each valve stem guide tube 38 in the cylinder head 13, and the other end of which reacts against a flanged washer 41 secured in a usual manner at the upper end of the particular valve stem 37.

A rocker arm cluster indicated generally at 42 is operatively mounted above each cylinder on rocker arm shafts 43 which are mounted on the tops of the cylinder heads 13 and 13', each rocker arm cluster including a rocker member 44 for the air intake valve for the particular cylinder, and a rocker member 44' for the exhaust valve for the particular cylinder, and each of the rocker members includes a valve stem actuating arm 45 extending from one side of the rocker arm shaft 43 above and in sliding abutment with the upper end of its particular valve stem, and likewise each rocker member includes a push rod actuated arm 46 extending from the opposite side of the rocker arm shafts 43.

A cam shaft 47 is operatively mounted in the crank case 11 at one side of the crank shaft 23, and the cam shaft is driven in a usual manner by the crank shaft as by means of gearing located within the gear housing 48 provided at one end of the crank case.

A cam 49 is provided on the cam shaft 47 for each valve, and a push rod indicated generally by 50 is operatively mounted between each cam 49 and one of the push rod actuated arms 46, each push rod being slidably mounted in push rod guide bearing means indicated generally by 51 and located in the crank case 11, and each push rod extends through sealing and lubricant return tube means indicated generally by 51' and located in the crank case 11, in the cylinder block 12, and in one of the cylinder heads 13 or 13', and the lower end of each push rod 50 abuts against the cam surface of its cam 49, and the upper end of each push rod 50 is provided with a ball and socket connection 52 with its push rod actuated arm 46.

Each air intake valve seat orifice 33 communicatingly connects with one end of an air intake port or passageway 53, the intake ports 53 being formed in the walls of the cylinder heads 13 and 13', and the intake ports of each cylinder head connecting at their outer ends with an intake manifold 54, and each intake manifold 54 communicatingly connecting as by means of an elbow 55 preferably with an air cleaner 56.

Each exhaust valve seat orifice 34 communicatingly connects with one end of an exhaust port or passageway 57, the exhaust ports 57 being formed in the walls of the cylinder heads 13 and 13' and the exhaust ports of each cylinder head terminating at their outer ends in a connector flange 58 whereby the exhaust ports may be communicatingly connected with an exhaust manifold, not shown.

Novel cooling means indicated generally by 59 are provided for the engine 10, and are hereinafter set forth in detail, and include in general a water pump 60 operatively connected in a usual manner with the crank shaft 23 as by means of gearing contained in the gear housing 48, the pump 60 delivering water into communicating water jacket chambers formed in the crank case, in the cylinder block, and in the cylinder heads, and the water jackets of each cylinder head being provided with a cooling water outlet pipe 61 which may be connected in the usual manner with a radiator, not shown, and the radiator being in turn connected in a usual manner with the intake of the pump 60.

In the engine 10, a chamber $C_v$ is formed within the bore 20 of each cylinder 14 and between a normally top or end flat circular face 62 of the piston 21 operating within the particular bore 20 and the opposite flat circular normally lower inner surface or face 29 of the normally lower cylinder head wall 28 covering the particular bore 20.

Each of the chambers $C_v$ by reason of the reciprocation of the piston forming one wall of the same may be termed a varying volume chamber, and in the engine 10, at top dead center, that is when the end face 62 of each piston 21 has reached its position of maximum travel away from the crank shaft 23, there is only mechanical clearance between the end face 62 of the piston and the opposite flat cylinder head inner face 29.

Walls of the engine form constant volume chambers, one for each cylinder. Each constant volume chamber $C_c$ is located closely adjacent to and entirely at the side of the corresponding varying volume chamber $C_v$, and between each constant volume chamber $C_c$ and its cylinder, walls of the engine form a passageway P communicatingly connecting at one end with the particular constant volume chamber $C_c$ and at the other end with the cylinder bore of the adjacent varying volume chamber $C_v$.

Each constant volume chamber $C_c$ is formed with a curved inner surface 70 which is symmetrical about an axis extending through the center 71 of the constant volume chamber and at right angles to the plane passing through the center 71 of the constant volume chamber and the axial direction or line of movement 72 of the piston 21 in the adjacent cylinder.

As illustrated, the curved inner face 70 of each constant volume chamber $C_c$ is preferably spherical.

Each passageway P connecting a particular constant volume chamber $C_c$ with the adjacent varying volume chamber $C_v$ is provided with an inner face 73 which is laterally continuous with the preferably flat inner cylinder head face 29 of the adjacent varying volume chamber $C_v$, and each laterally continuous passageway face 73 is tangential with the curved inner surface 70 of the constant volume chamber $C_c$ connected with the adjacent varying volume chamber $C_v$ by the particular passageway P.

The width $w$ of each passageway P is as illustrated substantially equal to the diameter of the preferred spherical inner surface 70 for each constant volume chamber $C_c$, and the minimum height $h$ of each passageway P is preferably somewhat less than the radius of the preferred spherical inner surface 70.

As illustrated each constant volume chamber $C_c$ is formed by members located in a socket 74 provided in the upper end wall 15 of the cylinder block. The bottom surface of each socket 74 is hemispherical and the top surface of each socket 74 is cylindric and tangential with the bottom hemispherical surface.

Preferably a removable liner shell 75 is located in the bottom of each socket 74, each liner shell 75 being preferably externally and internally hemispherical, and the internal hemispherical surface of each liner shell 75 forming a portion of the spherical inner surface 70 of the constant volume chamber $C_c$ formed in part by the particular liner shell 75.

In the upper cylindric end of each socket 74, a preferably removable member 76 is located, and as illustrated each member 76 is externally cylindric and its upper end extends beyond the normally top wall 15 of the cylinder block and into a cylindric recess 77 formed in the adjacent cylinder head lower wall 28.

In the normally lower face of each member 76 is formed a cavity 78 which includes the normally upper portions of the spherical inner surface 70 of the particular constant volume chamber $C_c$ formed in part by the particular member 76, and each cavity 78 also includes end portions 79 of the passageway P communicatingly connecting the particular constant volume chamber $C_c$ with the adjacent varying volume chamber $C_v$.

The remaining portions of each passageway P are formed by an extension of the inner face 29 of the adjacent and connected varying volume chamber $C_v$, and by the side and bottom faces of a notch 80 formed in the upper end of the cylinder sleeve 14 of the particular chamber $C_v$ and by the side and bottom faces of a notch 81 formed in the wall 15 of the cylinder block between the cylinder sleeve notch 80 and the adjacent socket 74.

The air intake valve means heretofore described in general comprises means operated in a usual manner for introducing preferably atmospheric air including gaseous oxygen, or in other words a combustion supporting medium, into each varying volume chamber $C_v$ on the air intake stroke of the piston thereof; and the exhaust valve means heretofore described in general, provide means for exhausting each varying volume chamber $C_v$ during the exhaust stroke of the piston thereof.

Means are also provided for injecting the preferably liquid hydrocarbon fuel into each constant volume chamber $C_c$ preferably during the compression stroke of the associated piston, probably as set forth in my said U. S. Letters Patent No. 1,960,093.

In the foregoing, the engine 10 is described as including the improvements relating to combustion chambers particularly set forth and claimed in my said U. S. Letters Patent No. 1,960,093, and also generally as including the improvements in valve apparatus particularly set forth and claimed in my said application, Serial No. 678,089, and with which the present improvements are preferably combined, and according to which in the engine 10, walls of the cylinder block 12 have formed therein longitudinally extending water jacket or cooling compartments or chambers 160 and 160' which are located beneath the upper or top wall 15 of the cylinder block and beneath and surrounding the portions 161 thereof forming the sockets 74 in which the constant volume chamber shells 75 and removable members 76 are located as aforesaid.

The chamber 160 is located beneath the cylinder head 13 and the chamber 160' is located beneath the cylinder head 13'.

The chambers 160 and 160' are longitudinally alined with each other, and a laterally extending common partition wall 162 forms the inner adjacent ends of the chambers 160 and 160'.

The walls forming the chambers 160 and 160' include as aforesaid the cylinder block top wall 15, the lateral partition wall 162, and in addition thereto the cylinder block lower or bottom wall 16, the cylinder block end walls 163 and 163', the cylinder block side wall 164 at the constant volume chamber side of the engine, and a partition wall 165 which extends longitudinally between the end walls 163 and 163' of the cylinder block and the top and bottom walls 15 and 16 thereof, and which wall 165 is located between the walls 161 of the constant volume chambers and the cylinders 14.

There are also formed in the cylinder block 12 cooling chambers 166 and 166' located respectively beneath the cylinder heads 13 and 13' and which surround the cylinders 14 and the sealing and lubricant return tubes 146 included in the preferred sealing and lubricant return tube means 51', which are more particularly set forth and claimed in my said prior application, Serial No. 678,689.

The walls forming the cooling chambers 166 and 166' include the cylinder block top and bottom walls 15 and 16, the longitudinally extending partition wall 165, the cylinder block end walls 163 and 163', the cylinder block side wall 167 at the push rod side of the engine, and the lateral partition wall 162.

The water pump 60 as illustrated is mounted on the crank case 11 at the constant volume chamber side of the engine, and the crank case 11 includes walls forming two water delivery passageways 168 and 168', the lower ends of which communicate with the outlet of the pump 60, and the upper ends of which communicate respectively with the cooling chambers 160 and 160' through apertures 169 and 169' formed in the cylinder block bottom wall 16.

The partition wall 165 has formed therein at its upper end, restricted openings or apertures 170 preferably one at each side of and closely adjacent the cylinder block top wall portions 161 of the constant volume chambers.

As illustrated the apertures 170 are formed by drilling vertically downwardly through the cylinder block top wall 15 and into the partition wall 165 with a drill whose diameter is larger than the thickness of the partition wall 165, after which the holes thus drilled in the cylinder block top wall 15 are threaded and closed with screw plugs 171 thereby forming the apertures 170 between the bottoms of the plugs 171 and the inner faces of the notches thus formed by the drill in the wall 165.

By these means the apertures or openings 170 may be made of the desired restricted size and at the desired location closely adjacent the constant volume chamber portions 161 of the cylinder block top wall 15.

The cylinder heads 13 and 13' have formed therein cooling or water jacket chambers indicated generally respectively by 172 and 172', and surrounding the walls of the valve seat orifices 33 and 34 and the ports or passageways 53 and 57.

Communication is effected between the cylinder head chambers 172 and 172' and the cylinder block chambers 166 and 166' respectively by means of registering openings 173 formed in the top wall 15 of the cylinder block and the lower bottom walls 28 of the cylinder heads.

Partition or water deflecting walls 174 and 175 are preferably provided in each cylinder head, and are so arranged that the cooling medium, usually water, is caused to pass between the air inlet passageways 53 and the exhaust passageways 57.

As aforesaid each cylinder head is provided with a cooling water outlet pipe 61 communicating with its water jackets or cooling chambers and which is adapted for connection in the usual manner with a radiator, not shown, and the radiator in turn being connected in a usual manner with the intake of the water pump 60.

By the foregoing construction and arrangement of the improved engine and cooling apparatus therefor, the cooling medium, usually water, is introduced at a low temperature into the chambers 160 and 160' beneath and surrounding the cylinder block wall portions 161 of the constant volume or ignition chambers.

Because of the location of the restricted openings 170 closely adjacent each side of each constant volume or ignition chamber wall portion 161 of the cylinder block top wall 15, the cooling water flows at a relatively high velocity about the wall portions 161, which are the hottest portions of the engine requiring cooling, and then the cooling water flows through the cylinder cooling chambers 166 and 166' and up through the openings 173 about the valve seat orifices and the passageways therefor, being directed as aforesaid between the air intake and exhaust passageways.

It is to be noted that by locating the constant volume or ignition chambers of the engine in the cylinder block, and by first cooling the walls of the constant volume or ignition chambers as aforesaid by a relatively high velocity flow of cooling medium directed about the walls of the constant volume or ignition chambers, the ignition chamber walls are kept as cool as the other walls of the cylinder block, and cracking of the block is thus avoided.

It is also to be noted that by locating the constant volume chambers in the cylinder block, rather than in the cylinder head, adequate cooling of the constant volume chambers is facilitated, since locating the constant volume chambers in the cylinder head, together with the necessary valve apparatus, requires so much space that the provision of adequate cooling chambers is very difficult if not impossible.

In other words locating the constant volume or ignition chambers of the engine in the cylinder block and cooling the same as aforesaid and locating the valves and the valve seats and passageways therefor in the cylinder head and cooling the same as aforesaid, very materially facilitates the attainment of the desired high speed and high compression and high power output operation of the engine over prolonged periods.

Moreover it should be particularly noted, that by forming the cylinder block cooling compartments in part by the longitudinally extending partition wall 165, the desired arrangement of the cooling compartments is attained, and the partition wall 165 cooperates structurally in the engine so as to enable the attainment of a minimum dead weight thereof, by reason of the fact that the partition wall 165 provides an additional reacting means cooperating with the through bolts and nuts 19 by which the cylinder heads 13 and 13', the cylinder block 12, the crank case 11, and the lower halves 17 of the main bearing blocks 18 are unitarily secured together, as heretofore set forth.

I claim:

1. In an internal combustion engine, a plurality of cylinders each having a bore extending therethrough, and the cylinders being arranged in a longitudinally extending row, walls forming a plurality of constant volume chambers, one constant volume chamber for each cylinder, and the constant volume chambers being arranged in a longitudinally extending row at one side of the row of cylinders, walls forming a plurality of passageways, each passageway communicatingly connecting at one end with one of the constant volume chambers and at the other end with the bore of the adjacent cylinder, and a longitudinally extending partition wall extending between the row of cylinders and the row of constant volume chambers.

2. In an internal combustion engine, a plurality of cylinders each having a bore extending therethrough, and the cylinders being arranged in a longitudinally extending row, walls forming a plurality of constant volume chambers, one constant volume chamber for each cylinder, and the constant volume chambers being arranged in a longitudinally extending row at one side of the row of cylinders, walls forming a plurality of passageways, each passageway communicatingly connecting at one end with one of the constant volume chambers and at the other end with the bore of the adjacent cylinder, a longitudinally extending partition wall extending between the row of cylinders and the row of constant volume chambers, walls forming with the longitudinally extending partition wall a cooling chamber surrounding the constant volume chambers, and a cooling chamber surrounding the cylinders, the partition wall being common to each cooling chamber and the partition wall having formed therein restricted openings at each side of the walls for each constant volume chamber, and means for flowing a cooling medium into the cooling chamber about the constant volume chamber walls, through the restricted openings, and through the cooling chamber about the cylinders.

3. In an internal combustion engine, a plurality of cylinders each having a bore extending therethrough, and the cylinders being arranged in a longitudinally extending row, walls forming a plurality of constant volume chambers, one constant volume chamber for each cylinder, and the constant volume chambers being arranged in a longitudinally extending row at one side of the row of cylinders, walls forming a plurality of passageways, each passageway communicatingly connecting at one end with one of the constant volume chambers and at the other end with the bore of the adjacent cylinder, a longitudinally extending partition wall extending between the row of cylinders and the row of constant volume chambers, walls forming with the longitudinally extending partition wall a cooling chamber surrounding the constant volume chambers, and a cooling chamber surrounding the cylinders, the partition wall being common to each cooling chamber and the partition wall having formed therein a restricted opening adjacent the walls for each constant volume chamber, and means for flowing a cooling medium into the cooling chamber about the constant volume chamber walls, through the restricted opening, and through the cooling chamber about the cylinders.

4. In an internal combustion engine, a cylinder block including a cylinder, walls in the cylinder block forming a constant volume chamber and walls in the cylinder block forming a passageway communicatingly connecting at one end with the constant volume chamber and at the other end with the interior of the cylinder, means for injecting fuel charges into the constant volume chamber, and the cylinder block including walls forming longitudinally extending cooling chambers, one cooling chamber surrounding the constant volume chamber walls and the other cooling chamber surrounding the cylinder, and the cooling chamber forming walls including a partition wall between the constant volume chamber walls and the cylinder, the partition wall having formed therein a restricted opening adjacent the constant volume chamber walls, and one of the cooling chamber forming walls at the constant volume chamber side of the partition having formed therein a cooling medium inlet opening, and another of the cooling chamber forming walls at the cylinder side of the partition having formed therein a cooling medium outlet opening, and means for flowing a cooling medium into the inlet opening and successively through the cooling chamber about the constant volume chamber walls, through the restricted opening, and through the cooling chamber about the cylinder.

5. In an internal combustion engine, a cylinder block including a cylinder, walls in the cylinder block forming a constant volume chamber and walls in the cylinder block forming a passageway communicatingly connecting at one end with the constant volume chamber and at the other end with the interior of the cylinder, means for injecting fuel charges into the constant volume chamber, and the cylinder block including walls forming longitudinally extending cooling chambers, one cooling chamber surrounding the constant volume chamber walls and the other cooling chamber surrounding the cylinder, and the cooling chamber forming walls including a partition wall between the constant volume chamber walls and the cylinder, the partition wall having formed therein restricted openings, one adjacent each side of the constant volume chamber walls, and one of the cooling chamber forming walls at the constant volume chamber side of the partition having formed therein a cooling medium inlet opening, and another of the cooling chamber forming walls at the cylinder side of the partition having formed therein a cooling medium outlet opening, and means for flowing a cooling medium into the inlet opening and successively through the cooling chamber about the constant volume chamber walls, through the restricted openings, and through the cooling chamber about the cylinder.

6. In an internal combustion engine, a cylinder block including a cylinder, upper walls in the cylinder block forming a constant volume chamber and walls in the cylinder block forming a passageway communicatingly connecting at one end with the constant volume chamber and at the other end with the upper end of the cylinder interior, means for injecting fuel charges into the constant volume chamber, and the cylinder block including walls forming longitudinally extending cooling chambers, one cooling chamber being below and surrounding the constant volume chamber walls and the other cooling chamber surrounding the cylinder, and the cooling chamber forming walls including a partition wall between the constant volume chamber walls and the cylinder, the partition wall having formed therein at its upper portion a restricted opening adjacent the constant volume chamber walls, and one of the cooling chamber forming walls at the constant volume chamber side of the partition having formed therein at its lower portion a cooling medium inlet opening, and another of the cooling chamber forming walls at the cylinder side of the partition having formed therein a cooling medium outlet opening, and means for flowing a cooling medium into the inlet opening and successively through the cooling chamber about the constant volume chamber walls, through the restricted opening, and through the cooling chamber about the cylinder.

7. In an internal combustion engine, a cylinder block including a cylinder, upper walls in the cylinder block forming a constant volume chamber and walls in the cylinder block forming a passageway communicatingly connecting at one end with the constant volume chamber and at the other end with the upper end of the cylinder interior, means for injecting fuel charges into the constant volume chamber, and the cylinder block including walls forming longitudinally extending cooling chambers, one cooling chamber being below and surrounding the constant volume chamber walls and the other cooling chamber surrounding the cylinder, and the cooling chamber forming walls including a partition wall between the constant volume chamber walls and the cylinder, the partition wall having formed therein at its upper portion restricted openings, one adjacent each side of the constant volume chamber walls, and one of the cooling chamber forming walls at the constant volume chamber side of the partition having formed therein at its lower portion a cooling medium inlet opening and another of the cooling chamber forming walls at the cylinder side of the partition having formed therein a cooling medium outlet opening, and means for flowing a cooling medium into the inlet opening and successively through the cooling chamber about the constant volume chamber walls, through the restricted openings, and through the cooling chamber about the cylinder.

8. In an internal combustion engine, a cylinder, walls forming a constant volume chamber and walls forming a passageway communicatingly connecting at one end with the constant volume chamber and at the other end with the interior of the cylinder, means for injecting fuel charges into the constant volume chamber, walls forming cooling chambers, one cooling chamber surrounding the constant volume chamber walls and the other cooling chamber surrounding the cylinder, and the cooling chamber forming walls including a partition wall between the constant volume chamber walls and the cylinder, the partition wall having formed therein a restricted opening adjacent the constant volume chamber walls, and one of the cooling chamber forming walls at the constant volume chamber side of the partition having formed therein a cooling medium inlet opening, and another of the cooling chamber forming walls at the cylinder side of the partition having formed therein a cooling medium outlet opening, and means for flowing a cooling medium into the inlet opening and successively through the cooling chamber about the constant volume chamber walls, through the restricted opening, and through the cooling chamber about the cylinder.

9. In an internal combustion engine, a cylinder having a bore extending therethrough, a cylinder head including a wall having an inner face extending across and closing one end of the cylinder bore, the cylinder head closure wall having formed therein an intake valve seat orifice and an outlet valve seat orifice in the inner face extending across the end of the cylinder bore, walls forming an intake passageway communicatingly connecting at one end with the intake valve seat orifice and an exhaust passageway communicatingly connecting at one end with the exhaust valve seat orifice, valves operatively mounted in the cylinder head in association with the valve seat orifices, walls forming cooling chambers about the valve seat orifices and the passageways, walls forming a constant volume chamber and walls forming a passageway communicatingly connecting at one end with the constant volume chamber and at the other end with the interior of the cylinder, means for injecting fuel charges into the constant volume chamber, walls forming seperate side by side cooling chambers, one of the side by side cooling chambers surrounding the constant volume chamber walls and another of the side by side cooling chambers surrounding the cylinder, and some of the cooling chamber walls forming a restricted opening adjacent the constant volume chamber walls and providing communication between the cooling chamber surrounding the constant volume chamber walls and the cooling chamber surrounding the cylinder and an opening providing communication between the cooling chamber surrounding the cylinder and the cooling chambers surrounding the valve seat orifices and passageways, and means for flowing a cooling medium into the cooling chamber about the constant volume chamber walls, through the restricted opening, through the cooling chamber about the cylinder, through the opening between the cylinder cooling chamber and the valve seat orifice and passageway cooling chambers, and through the cooling chamber about the valve seat orifices and the passageways.

10. In an internal combustion engine as set forth in claim 9, the intake and exhaust passageway walls and the cooling chamber walls of the cylinder head being arranged so that the cooling medium flows from the opening into the cylinder head cooling chambers between the intake and exhaust passageway walls.

OTIS D. TREIBER.